United States Patent Office 2,740,624
Patented Apr. 3, 1956

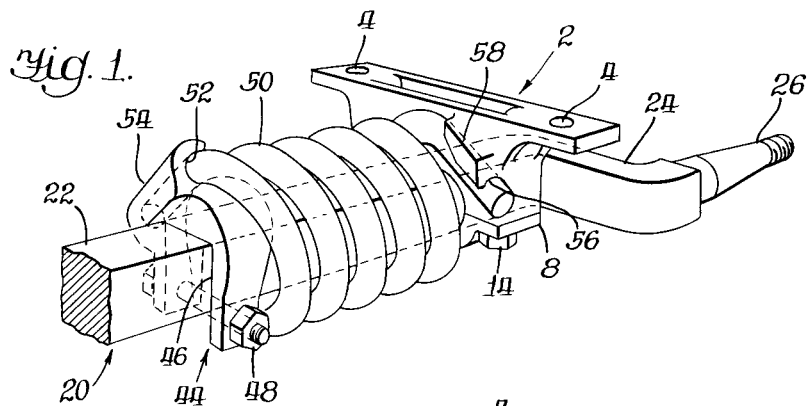
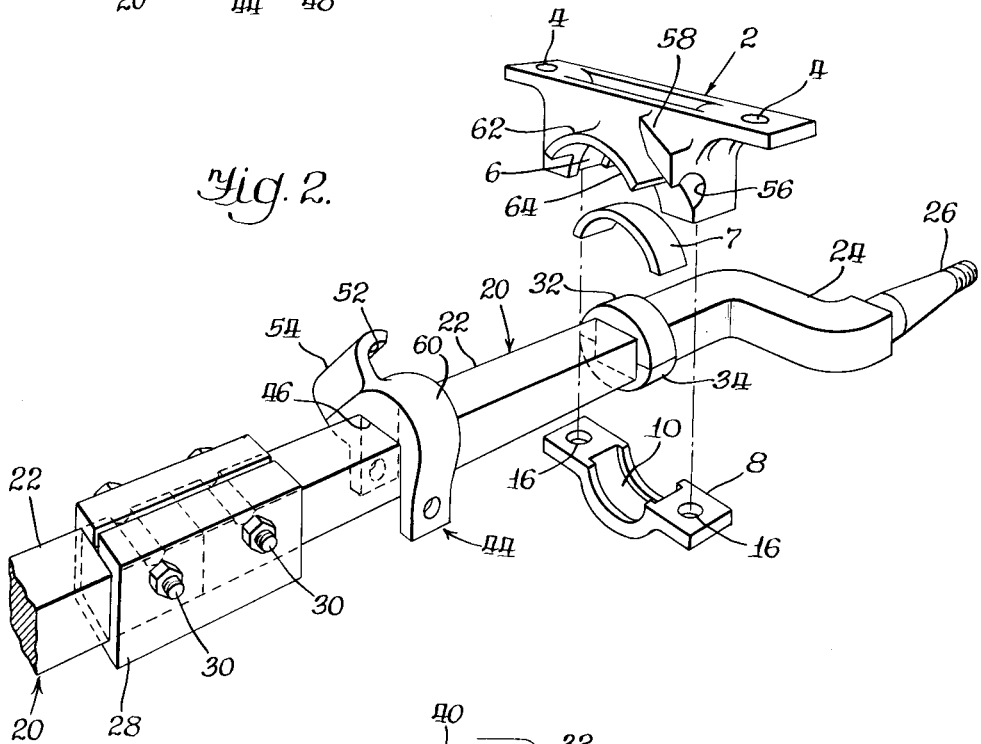
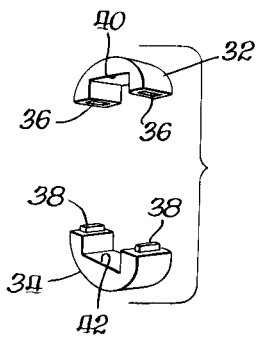

2,740,624

AXLE ASSEMBLY

Robert B. Cottrell, Chicago, Ill., assignor to American Steel Foundries, Chicago, Ill., a corporation of New Jersey Application May 15, 1952, Serial No. 287,866

8 Claims. (Cl. 267—58)

This invention relates to a torsion spring assembly wherein a coil spring sleeved over an axle on a shaft is operatively connected thereto to resist rotation thereof in response to torque forces imposed upon the shaft as, for example, when the assembly is utilized in the connection between a vehicle and its supporting means, such as a wheel, pontoon, or ski.

A primary object of the invention is to devise such an assembly wherein the spring may be quickly attached and detached with respect to the means for anchoring the ends of the spring to the axle and vehicle, respectively, and wherein the spring may be removed from the axle for replacement.

A further object of the invention is to devise an assembly having readily removable spring clips for anchoring one end of the spring to the axle.

Another object of the invention is to provide generous bearing areas between the ends of the spring and the anchor means thereof.

A further object of the invention is to devise readily replaceable bearings between the axle and the supported vehicle.

Yet another object of the invention is to provide novel bearing for the inside diameter of the spring at the end coils thereof, whereby rotational movement of the axle in its bearings is effective to deform the spring primarily by bending the same.

The foregoing and other objects and advantages of the invention will become apparent from a consideration of the following specification and the accompanying drawings, wherein:

Figure 1 is a fragmentary perspective view of a torsion spring assembly embodying the invention;

Figure 2 is another fragmentary, partly exploded perspective view of the assembly, and Figure 3 is an exploded view of the axle bearings.

Describing the invention in detail, the novel torsion spring assembly comprises a bracket, generally designated 2, which may be an integral part of a vehicle or may be attached thereto as by screws (not shown) extending through openings 4 of the bracket. The bracket 2 comprises a semi-cylindrical bearing surface 6 which is preferably provided with a readily replaceable insert or liner 7. The bracket also comprises a cap 8 having a semi-cylindrical bearing surface 10, the surfaces 6 and 10 defining a bearing opening for a purpose hereinafter described. The cap 8 is preferably removably attached to the bracket 2 as, for example, by screws 14 extending through openings 16 of the cap which may, if desired, be integrally formed with the bracket or connected thereto in any other desired manner as, for example, by welding.

An axle or shaft, generally designated 20, comprises a non-round portion 22, which is illustrated as substantially square in cross section; however, as will be understood from the following description, the portion 22 may be of any other desired non-round cross section such as, for example, triangular or hexagonal. The portion 22 is provided with a crank arm 24, anchored thereto or integrally formed therewith, as illustrated in the drawings, said arm having a conventional spindle 26 or other convenient means for attachment to a wheel (not shown) or to other vehicle supporting means (not shown), such as a pontoon, ski, or roller for a tank track.

The shaft portion 22 may, if desired, be integrally connected to the corresponding portion 22 of another axle or shaft 20, or as illustrated in Figure 2, the portions 22 of the shafts 20 may be separable and may be connected by a split sleeve 28 and bolts 30. In this connection, it may also be noted that, if desired, both of the shafts 20 may be provided with crank arms 24 and wheel attaching means 26 or, if desired, only one of the shafts 20 may be so provided, in which case the other shaft may, if desired, be eliminated.

The portion 22 of the shaft 20, which is illustrated in Figure 1 and is illustrated at the right in Figure 2, is provided with a substantially cylindrical segment or portion, preferably defined by split bearings 32 and 34, adapted for rotational movement in the bracket opening defined by the bearing surfaces 6 and 10. Said bearings 32 and 34, as best seen in Figure 3, have mating apertures and lugs 36 and 38, respectively, and are formed with grooves or recesses 40 and 42, respectively, whereby when the bearings 32 and 34 are assembled, as seen in Figure 2, the grooves 40 and 42 are complementary in form to that of the non-round shaft portion 22, thereby affording an interlock against rotational movement relative thereto.

The shaft portion 22 is also provided with a spring clip, generally designated 44 and having spaced jaws defining an aperture 46 corresponding in form to that of said shaft portion 22 to afford an interlock against relative rotational movement with respect thereto, said clip being readily separable with respect to the shaft portion 22, and being detachably connected thereto as by a bolt and nut assembly 48 (Figure 1).

Thus it will be apparent that the non-round configuration of the shaft 22, and the corresponding configuration of the jaw 46, the grooves 40 and 42, and the inside of the sleeve 28, positively interlock these parts against relative rotational movement about the longitudinal axis of the shaft portion 22 during rotation thereof in service, as hereinafter described.

A helical spring 50 (Figure 1) is sleeved over the shaft portion 22 and the bearings 32, 34, one end of said spring being received within a complementary groove or recess 52 in an arm or lug 54 of the spring clip 44; and the other end of the spring 50 is received within a complementary groove or recess 56 in the bracket 2, partly defined by a lug or ledge 58 thereof. It may be noted, as seen in Figure 1, that the ends of the spring 50 extend tangentially in a plane approximately perpendicular to the longitudinal axis of the shaft 22, and said ends are preferably straight and arranged diagonally; however, it will be understood that, if desired, the ends of the spring may be vertical or horizontal.

The inside diameter of the end coil of the spring 50, adjacent the clip arm 54, preferably bears against a complementary arcuate bearing surface 60 of the clip, said surface 60 being complementary to the curve of the inside diameter of the spring; and the inside diameter of the opposite end coil of the spring preferably bears against a similar arcuate bearing surface 62 (Figure 2) formed on a flange 64 of the bracket 2, whereby rotational movement of the arm 24 upwardly from the position shown in Figure 1, or downward movement of the bracket 2 from the position shown in that figure is yieldable resisted by the spring 50 when the vehicle carried by the bracket is supported by means on the spindle 26, as heretofore described.

Thus it will be understood that load or weight of the vehicle transmitted to the shaft 20 through the bearing surface 6 is supported by the spring 50, and upward rotational movement of the arm 24 from the position shown in Figure 1, due to an impact against the vehicle supporting means carried by the spindle 26, is yieldingly resisted to cushion such impact.

I claim:

1. A torsion spring assembly comprising a bracket with a bearing, a shaft rotatably journaled therein, said shaft having a non-round portion, a spring clip detachably secured to said portion and having an aperture complementary thereto and receiving said portion, and a coil spring having one end thereof connected to the bracket, the opposite end of said spring being substantially straight and being in a plane approximately perpendicular to the longitudinal axis of said shaft, said opposite end being recessed in the clip to connect the spring to the clip for yieldingly resisting rotation of the shaft, said aperture being open at one side of the clip to accommodate removal of the clip by movement thereof away from the longitudinal axis of said shaft, and means removably attached to said clip for closing said open side of said aperture to prevent accidental disassembly of the clip from said shaft.

2. A torsion spring assembly comprising a bearing, a shaft rotatably mounted in said bearing, a spring clip having spaced jaws defining a non-round aperture open at one side thereof and receiving a complementary portion of the shaft and detachably connected thereto, a coil spring sleeved over the shaft, one end of the spring extending tangentially therefrom and detachably connected to the clip, the other end of the spring being anchored to the bearing, and means removably connected to at least one of said jaws for closing said open side of said aperture to prevent accidental disassembly of the clip by movement thereof away from the rotational axis of the shaft.

3. A torsion spring assembly comprising a bearing bracket having an opening, a shaft having a substantially cylindrical segment rotatably journaled in the opening, a spring clip having a non-round aperture slidably fitted over a complementary portion of said shaft and detachably connected thereto, a coil spring sleeved over the shaft, the ends of said spring being substantially straight and being in a plane approximately perpendicular to the longitudinal axis of said spring, said ends being received within complementary grooves of the clip and bracket, respectively, means on the clip and bracket bearing against the inside diameter of the spring within the end coils thereof, said aperture being open at one side of the clip to accommodate removal of the clip by movement thereof away from said axis, and means removably attached to said clip for closing said open side of said aperture to prevent accidental disassembly of the clip from said shaft.

4. A torsion spring assembly comprising a structure having a bearing opening, a shaft having a non-round portion, a bearing comprising a plurality of separable segments with non-round recesses complementary in form to that of said shaft portion, said bearing being confined within said opening for rotation as a unit therein upon rotation of said shaft, a spring clip having a non-round aperture complementary in form to that of said shaft portion, said aperture receiving said shaft portion, an arm on said clip defining a groove, a lug on said structure partly defining a groove therein, a helical spring sleeved over the shaft, said spring having its ends confined within the respective grooves, said aperture being open at one side of the clip to accommodate removal thereof by movement away from the rotational axis of said shaft, and means removably attached to said clip for closing said open side of said aperture to prevent accidental disassembly of the clip from said shaft.

5. An assembly, according to claim 4, wherein the shaft is provided with a crank arm anchored thereto and having means for connection to associated vehicle support means.

6. An axle assembly for a vehicle having a bearing opening, said assembly comprising a non-round shaft having a substantially cylindrical bearing rotatably mounted in said opening, a crank arm anchored to the shaft and having wheel attaching means, a spring clip having a non-round aperture slidably fitted on said shaft and complementary thereto, means detachably connecting the clip to the shaft, a coil spring sleeved over the shaft, said springs having approximately straight ends extending tangentially therefrom, means for detachably anchoring said ends of the spring to the clip and vehicle, respectively, said aperture being open at one side thereof to accommodate removal of the clip by movement thereof away from the longitudinal axis of the shaft, and means removably attached to said clip for closing said open side of said aperture.

7. An assembly, according to claim 6, wherein the bearing is formed of a plurality of separable segments defining a non-round opening complementary in form to that of said shaft and receiving the same.

8. An assembly, according to claim 6, wherein the ends of the springs are approximately straight and are approximately circular in cross section, the anchor means being in the form of grooves in the clip and vehicle.

References Cited in the file of this patent

UNITED STATES PATENTS

| Re. 8,135 | Saladee | Mar. 26, 1878 |
| 382,290 | Baltes | May 8, 1888 |
| 1,374,829 | Davis | Apr. 12, 1921 |
| 1,445,408 | Oertli | Feb. 13, 1923 |
| 1,934,767 | Laher | Nov. 14, 1933 |
| 1,956,877 | Prouty et al. | May 1, 1934 |
| 2,089,607 | Hill | Aug. 10, 1937 |
| 2,426,513 | Linn | Aug. 26, 1947 |
| 2,455,787 | Linn | Dec. 7, 1948 |